Dec. 17, 1935.    W. R. McCANN    2,024,830
PROCESS FOR THE STORAGE OF SOLUBLE SALTS
Filed July 3, 1933
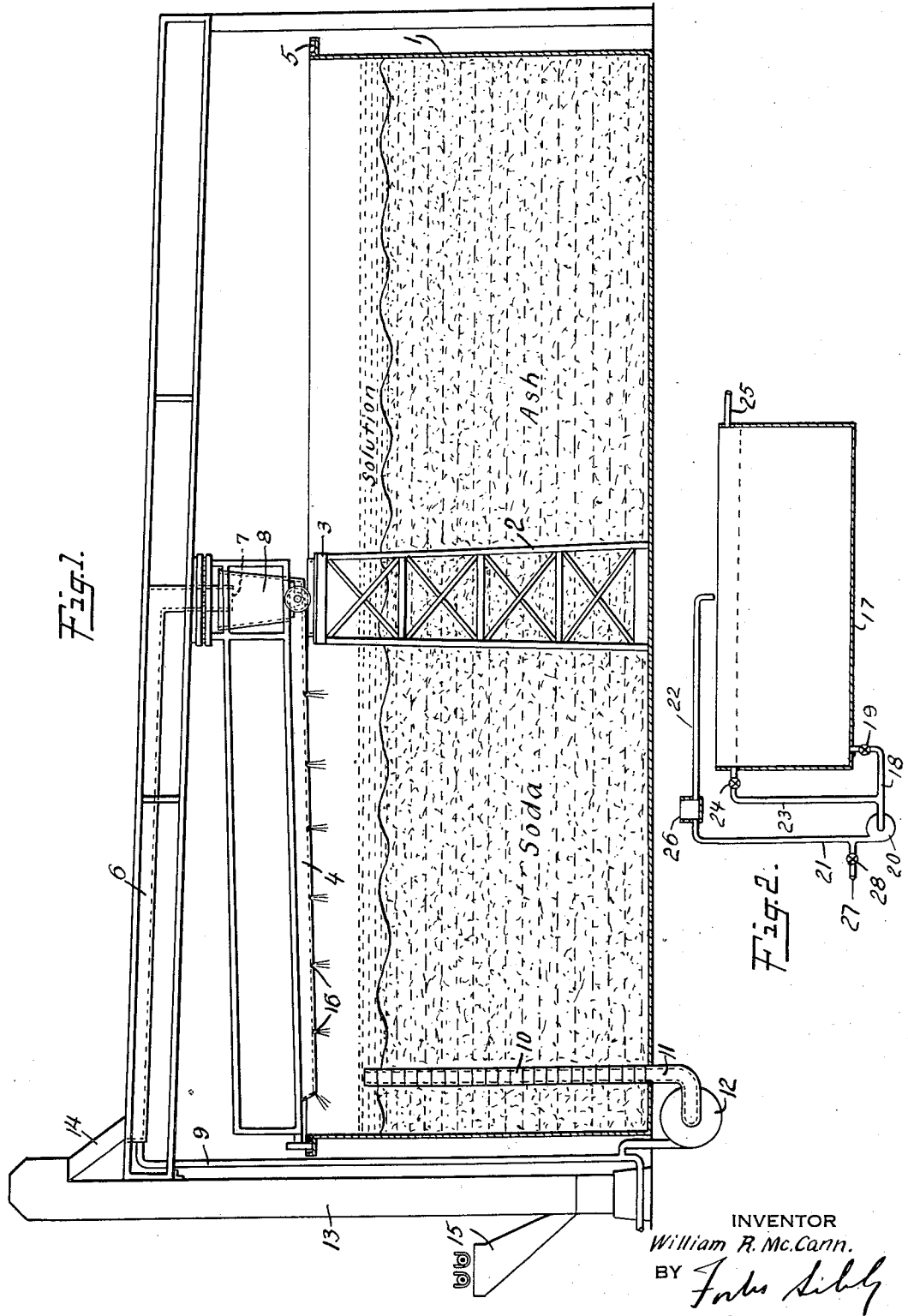
INVENTOR
William R. Mc.Cann.
BY
ATTORNEY Patented Dec. 17, 1935

2,024,830

UNITED STATES PATENT OFFICE 2,024,830

PROCESS FOR THE STORAGE OF SOLUBLE SALTS

William R. McCann, Petersburg, Va., assignor to Atmospheric Nitrogen Corporation, New York, N. Y., a corporation of New York Application July 3, 1933, Serial No. 678,806

11 Claims. (Cl. 23—239)

This invention relates to a process for the storage of soluble salts. More particularly, this invention relates to the storage of salts soluble in water which form with water a mixture of saturated solution and solid or a cake which occupies a smaller volume than that occupied by the solid in its original condition.

In numerous commercial installations a material is utilized or manufactured which as ordinarily obtained is in the form of a dry solid, large quantities of which must be stored either preliminary to their use or to their distribution to the trade. The storage of such materials requires the installation and maintenance of large storage bins, housing facilities or the like.

It is an object of this invention to provide a process for the storage of soluble salts whereby a relatively large quantity of such salts may be stored in containers of a given size, thereby reducing the initial cost of the storage facilities required for storing the salt. Where the salts are to be utilized after storage in the form of solutions of the salts, it is an object of this invention to combine the storage of the salt with its dissolution in water, thereby obtaining an added economy over the present methods of storing the salts as the dry solids and providing special facilities for the preparation of solutions from the solid materials as these solutions may be required.

In storing a salt in accordance with the method of this invention, the substantially dry solid salt may be mixed with sufficient water to form a composition comprising undissolved solid material forming a relatively compact integral mass of solids in which the interstices between the solid particles are filled with a saturated solution of the salt. This mixture of solid and solution is stored in a container in which the apparent volume occupied by the integral mass of solid and saturated solution is materially less than the apparent volume of a corresponding quantity of the original solid material from which the mixture of solid and solution is prepared. The process of this invention is particularly applicable to the storage of a salt such as sodium carbonate which, in its technical form, is supplied as soda ash. The soda ash combines with water to form an integral mass of solid (which in the case of soda ash has the appearance of a coherent cake of the hydrated salt) having a smaller apparent volume than a corresponding quantity by weight of the original solid soda ash prior to mixing it with the water.

In employing the process of this invention for the storage of soda ash, for example, the dry soda ash may be mixed with water in the proportions of about 0.5 to 2 parts by weight of soda ash to every 1 part of water. This amount of water is sufficient to hydrate the soda ash and to form a mass of the hydrated salt. The mixture is prepared in or is introduced into a container wherein the mass of hydrated salt is formed by crystallization of the hydrate at a temperature above about 35° C. from the materials in the container, and the materials are stored until required for use, at which time the soda ash is recovered by introducing water into the container to dissolve the soda ash. In its preferred embodiment as used for the storage of soda ash, the process of this invention comprises introducing a saturated solution of soda ash into a container at a temperature above about 35° C. and supplying to the container further quantities of soda ash to crystallize therein hydrated sodium carbonate forming a mass of the solid hydrate occupying the major proportion of the volume of the container. The proportions of the materials in the mixture finally prepared and stored should be within the range of 0.5:1 to 2:1 parts by weight of soda ash to water and preferably the soda ash and water are in about equal proportions by weight. The soda ash is stored in the form of this mass of hydrated material in which the interstices between the solid particles are filled with a saturated solution of the soda ash, which solution may also be present in sufficient amount to form a supernatant layer on the mass of solid material. At such time as the soda ash is desired for use it may be recovered from storage by dissolving the solid in water introduced into the container.

In the drawing Figs. 1 and 2 show two types of apparatus suitable for carrying out the process of this invention.

The following example of a method for the storage of soda ash employing the apparatus shown in Fig. 1 of the accompanying drawing, is illustrative of the invention:

In the drawing a tank 1 which may be of steel and of any desired capacity, is provided at its center with a tower 2 carrying a platform 3 on which is pivoted for rotation a bridge supporting a flume 4. The bridge is supported at the end opposite from that pivoted on platform 3 by a track 5 supported by the rim of tank 1. Flume 4 is provided with a plurality of discharge openings 16 spaced along the length of the flume and controlled by gates whereby material flowing through the flume may be dropped into tank 1 and distributed in the tank by rotating the flume about the pivot on platform 3. Tower 2 is of such height that the end of flume 4 supported above the tower is at a somewhat higher level than the outer end of the flume. A second flume 6 is supported above tank 1 and communicates with flume 4 by means of a pipe 7 opening into an inlet 8 to flume 4. Flume 6 is supported in an inclined position slanting downwardly towards the point at which it discharges into pipe 7. A pipe 9 is arranged for conducting water into the upper end of flume 6, or flume 6 may be supplied with solution withdrawn from tank 1 through a pipe 10 of adjustable length opening into pipe 11 which leads through a pump 12 to pipe 9. Pipe 10 is built up of a plurality of sections fitting one on top of the other, the length of the pipe being varied by adding or removing sections as desired. A bucket elevator 13 leads to a chute 14 which opens into flume 6 at a point near the point of entry of water or solution introduced into the flume from pipe 9. A chute 15 serves to convey solid material into the bottom of elevator 13 whence it is conveyed to chute 14 and into flume 6.

In utilizing the apparatus described above and illustrated in the drawing for the storage of soda ash, the dry soda ash as it is received is transferred through chute 15 to elevator 13 where it is lifted and discharged through chute 14 into water or a recirculating soda ash solution entering the flume from pipe 9. In flume 6 the aqueous liquor and soda ash flow toward the center of tank 1 and are discharged through pipe 7 and inlet 8 into flume 4 and thence flow along flume 4 and out of the several discharge openings from this flume and drop into tank 1. In starting to fill tank 1 with material, the proportions of soda ash to water introduced into flume 6 may vary from about 1 to 3 to about 1 to 11, the preferred ratio depending upon the length of the flume since the quantity of water should be sufficient to convey substantially all of the solids to flume 4 and thence into tank 1, and also depends upon the rate of cooling of the mixture of water and soda ash while the desired quantity of water and soda ash are being filled into tank 1. While filling the tank, sections are added to pipe 10 to keep the top of the pipe somewhat above the level of solids which settle out around the pipe so that a clear passageway is maintained through the pipe. When the tank is filled to about one-half of its capacity, solution of soda ash is withdrawn from the tank through pipes 10 and 11 and is circulated to flume 6 through pipe 9 by pump 12 in place of the water previously introduced through pipe 9. The circulation of the solution, mixing with it soda ash, and conveying the mixture in tank 1 is continued until the solution in tank 1 at a temperature of not less than about 35° C. contains not less than about 34% sodium carbonate. If undue losses of heat are avoided, the mixing of the soda ash with the water and solution will result in the evolution of sufficient heat to attain and maintain a temperature not below about 35° C. even with the soda ash and water being supplied at a temperature as low as about 10° C. The circulation and mixing is continued and, under the foregoing conditions of temperature and concentration of solution, a salting out of monohydrated sodium carbonate from the mixture of water and soda ash will take place. The recirculation of the solution is continued while mixing it with further quantities of soda ash and with sufficient additional water so that when tank 1 is filled to the desired level the soda ash and water will be in the proportions of about 1 to 1. The solid material in tank 1 will settle out from the solution and will gradually form an integral mass covered by a relatively thin layer of solution, and is stored in this form until required. This mass has the appearance of a solid cake. It has a hard surface, but upon breaking this surface the interior of the mass is found to be not a hard solid. This phenomenon is probably due to the fact that in the large mass of material prepared for storage the interior of the mass does not cool to temperatures below 35° C. even in the course of several months time. It is believed that if the material is allowed to stand long enough to cool throughout to below about 35° C., a solid caked mass will result.

After storing the material and when it is desired for use, the sodium carbonate may be dissolved in water introduced into tank 1 to form a solution of sodium carbonate which may be withdrawn through pipes 10 and 11, recirculated if desired until of proper strength, and conveyed to any desired point. If desired, recirculation may be continued and a portion of the recirculating solution withdrawn as bleed. This method of withdrawing solution of sodium carbonate from the tank through pipe 10 is described in detail in the copending application of Walter Rowland, Serial No. 678,999, filed July 3, 1933. If desired, the sodium carbonate may be dissolved in tank 1 by flushing with water and the solution thus obtained siphoned or otherwise withdrawn over the top of the tank.

The method for charging soda ash and water into a storage tank described above provides for distributing the material in such a way that a layer of solids of substantially uniform depth throughout the interior of the tank will be formed. By employing an apparatus in which the material is conveyed through a single flume discharging only above the center of tank 1, a mass in the form of a cone-shaped pile with the apex of the cone above the center of the tank will be formed.

Another method of introducing soda ash into a storage tank, storing the ash in the tank in the form of a cake of hydrated material, and recovering the soda ash as a solution in water, is illustrated in Fig. 2 of the drawing, in which is shown a storage tank 17 provided with an outlet pipe 18 having a valve 19, which outlet pipe leads through a pump 20 and pipe 21 to a flume 22. A second outlet pipe 23 with a valve 24, communicates between pipe 18 and the upper portion of tank 17 at about the level to which it may be desired to fill the tank with material to be stored therein. An overflow pipe 25 opens from tank 17 at a level slightly above that at which pipe 23 communicates with the tank. Near the end of flume 22 with which pipe 21 communicates there is an opening 26 through which soda ash may be supplied to a liquid passing from pipe 21 through flume 22. A branch pipe 27 with a valve 28 leads from pipe 18.

In introducing soda ash into tank 17, with valves 19 and 28 closed and valve 24 open, the tank is filled with water to above the opening into pipe 23. Pump 20 is started and the water circulated through pipes 23, 21 and flume 22 while soda ash is introduced into the circulating water. As the soda ash enters the tank it settles out and forms an integral mass of solids in the bottom of the tank which gradually builds up as additional soda ash is added. The volume of solid plus solution in the tank increases with addition of the soda ash. The excess solution flows off through pipe 25 and may be utilized in any desired manner. For example, it may be introduced into another tank like tank 17 for use in treating soda ash to store it in that tank.

When the desired quantity of solid soda ash has been introduced into tank 17 and stored therein until required for reuse, a passageway is bored through the mass of hydrated sodium carbonate from above the surface of the mass through the mass and to outlet pipe 18 from the bottom of the tank. This passageway may be bored in any desired manner as, for example, by means of a stream of hot water or steam projected against the mass from a pipe which is gradually lowered towards pipe 18 as the solid about the end of the pipe carrying the steam or hot water is dissolved. When a passageway has been established through the mass of solid and the inlet pipe 18 and valve 19 have been freed of solid material by means of the hot water or steam, valves 19 and 28 are opened and with valve 24 closed, pump 20 is operated to withdraw the solution of sodium carbonate from tank 17, and discharge it through pipe 27. As solution is withdrawn water may be introduced into the tank to dissolve from the surface of the solid additional sodium carbonate. If desired, by operating valve 28 a continuous circulation of solution through pipes 18 and 21 and flume 22 may be maintained with addition of water at any point in this circulating system and withdrawal of sodium carbonate solution through pipe 18. This circulation of solution during the process of dissolving sodium carbonate from the surface of the mass of hydrated sodium carbonate in the tank, facilitates the production of a concentrated sodium carbonate solution.

Another method for charging a mixture of water and soda ash into a storage tank in carrying out the process of this invention comprises introducing soda ash and water into a vessel preferably positioned above the level of the top of the storage tank. The vessel is provided with a stirrer and a steam-jacketed chute enclosing a screw conveyor which extends from an overflow of the vessel to above the center of the storage tank where material may be discharged from the chute and dropped into the storage tank. Water is introduced into the mixing vessel and heated, for example, to about 60° C. by means of live steam. Then soda ash and additional quantities of water are continuously added to the vessel and mixed therein to form a saturated solution having a temperature of about 90° C. which overflows into the screw conveyor where it is mixed with additional soda ash and the mixture conveyed into the storage tank. The water and soda ash are introduced into the mixing vessel and conveyor in about equal proportions by weight. This method of charging a storage tank employing a mixing vessel and closed conveyor is of advantage in reducing absorption of carbon dioxide from the air by the soda ash solution while filling the storage tank.

While this invention has been particularly illustrated above by a description of its application to the storage of soda ash which forms an integral mass of hydrated material, the invention is not limited to the storage of such materials but is applicable generally to the storage of soluble salts. For example, common salt (sodium chloride) may be stored employing the process of this invention by introducing the solid salt and water into a storage tank, the water being in amount sufficient to form a saturated solution of the salt filling the interstices of the integral mass of solids which occupies the major proportion of the storage space. Sodium chloride, unlike the soda ash does not form what appears to be a coherent cake in the storage tank but the mixture of water and salt has a materially smaller apparent volume than does the corresponding amount by weight of the dry crystalline salt.

I claim:

1. The process for the storage of a soluble salt which with water forms a mass of smaller apparent volume than the solid salt prior to mixing with water which comprises mixing water with said salt in the form of a solid, said water being added in amount sufficient to form a solution of the salt filling the interstices between the particles of an integral mass of undissolved solid comprising the major proportion of said salt and to give a mass of solid and solution having a smaller apparent volume than the solid salt prior to the addition thereto of the water, and storing large quantities of the resulting mixture of solid and solution in a container of large capacity in which said integral mass is formed.

2. The process for the storage of a salt forming with water a mass of hydrate having a smaller apparent volume than the original solid salt prior to mixing it with the water which comprises introducing into a container of large capacity said salt and water, the salt being present in amount at least sufficient to form a saturated solution thereof, crystallizing from the materials thus introduced into the container said hydrate in amount such that the solid hydrate forms an integral mass occupying the major proportion of the volume of the container, and storing large quantities of said mass of hydrate in said container.

3. The process for the storage of soda ash which comprises mixing solid soda ash with water in amount sufficient to form an integral mass of solid which with the solution of soda ash present has a smaller apparent volume than the original solid soda ash and storing large quantities of the resulting product in a container of large capacity while it still contains the major proportion of the water originally mixed with said solid soda ash.

4. The process for the storage of soda ash which comprises mixing solid soda ash with water in amounts corresponding to the ratio of about 0.5 to 2 parts of soda ash to every 1 part of water introducing large quantities of said mixture, at a temperature above 35° C., into a container of large capacity, and storing said mixture in said container.

5. The process for the storage of soda ash which comprises introducing the soda ash and water into a container of large capacity, the soda ash being present in amount sufficient to form a saturated solution thereof, crystallizing at a temperature above about 35° C. a mass of mono-hydrated sodium carbonate from the materials thus introduced into the container, which with the solution present occupies a smaller apparent volume than the soda ash before addition thereto of the water and storing large quantities of said mass of solid and solution in the container.

6. The process for the storage of soda ash which comprises introducing the soda ash and water into a container of large capacity in the proportions of about 0.5 to 2 parts of soda ash to every 1 part of water, cooling the water and soda ash in the container from a temperature above about 35° C. to below 35° C. and storing the resulting mass of hydrated sodium carbonate and solution in the container.

7. The process for the storage of soda ash which comprises introducing into a container of large capacity a substantially saturated solution of soda ash and water having a temperature above about 35° C., introducing additional quantities of water and soda ash into said solution in the container in amounts such that the soda ash and water thus introduced into the container both as saturated solution and added to said solution are in about equal parts by weight, maintaining the temperature of the materials in the container above about 35° C. during the introduction of the water and soda ash, and storing large quantities of the resulting mass of solid hydrated sodium carbonate and solution in said container.

8. In a process wherein a soluble salt which when mixed with water forms a mass of solid and solution of smaller apparent volume than the original salt is to be dissolved in water to form a solution, that improvement which comprises adding a portion of the water to said soluble salt, the amount of water being sufficient to form a mass of solid salt and solution having a smaller apparent volume than the original solid salt prior to mixing it with the water, storing large quantities of said mass of solid and solution in a container of large capacity in which said mass is formed and then adding additional water to the material in said container to form a solution of said soluble salt, and withdrawing the solution from the container.

9. In a process wherein soda ash is to be dissolved in water to form a solution, that improvement which comprises adding a portion of the water to said soda ash, the amount of water being sufficient to combine with the soda ash to form a mass of hydrated sodium carbonate which with any solution present has a smaller apparent volume than the original solid soda ash prior to mixing it with the water, storing large quantities of the resulting product in a container of large capacity in which said mass of hydrated sodium carbonate is formed, and then introducing into said container additional water to form a solution of sodium carbonate and withdrawing the solution from the container.

10. In a process wherein soda ash is to be dissolved in water to form a solution, that improvement which comprises mixing said soda ash with sufficient water to form a mass of monohydrated sodium carbonate at a temperature above about 35° C., storing large quantities of said mass in a container of large capacity in which it is formed, passing additional water in contact with the hydrated sodium carbonate in said container to dissolve the sodium carbonate, and withdrawing the resulting solution from the container.

11. In a process wherein soda ash is to be dissolved in water to form a solution, that improvement which comprises adding a portion of the water to a portion of said soda ash to form a solution thereof, circulating said solution from and to a container of large capacity, introducing solid soda ash into said circulating stream of solution in amount in excess of that which is soluble in said solution at about 35° C. to form in the container a mass of hydrated sodium carbonate, storing large quantities of said mass in said container, then introducing additional water into contact with the surface of said mass of hydrated sodium carbonate to form a solution of sodium carbonate, and withdrawing the resulting solution from said container.

WILLIAM R. McCANN.